United States Patent
Rumsey et al.

[11] Patent Number: 5,984,482
[45] Date of Patent: Nov. 16, 1999

[54] MOUNTING ASSEMBLY FOR VEHICLE INTERIOR AUTOMATIC DIMMING REARVIEW MIRROR

[75] Inventors: Wayne J. Rumsey, Holland; Daniel J. Bostwick, Grandville, both of Mich.

[73] Assignee: Gentex Corporation, Zeeland, Mich.

[21] Appl. No.: 09/123,682

[22] Filed: Jul. 28, 1998

[51] Int. Cl.⁶ .................................................. G02B 7/182
[52] U.S. Cl. .......................... 359/871; 359/872; 359/873; 248/474; 248/476; 248/478
[58] Field of Search .................... 359/871, 872, 359/873, 874, 875, 877; 248/473, 474, 476, 477, 478, 479, 481, 549, 222.1, 224.1; 362/83.1

[56] References Cited

U.S. PATENT DOCUMENTS

| | | |
|---|---|---|
| 2,414,223 | 1/1947 | De Virgilis . |
| 3,104,897 | 9/1963 | Berger ..................................... 248/484 |
| 3,367,616 | 2/1968 | Bausch et al. . |
| 4,382,572 | 5/1983 | Thompson ............................... 248/484 |
| 4,614,412 | 9/1986 | Cohen . |
| 4,646,210 | 2/1987 | Skogler et al. . |
| 4,822,140 | 4/1989 | Mittelhauser . |
| 4,936,533 | 6/1990 | Adams et al. ......................... 248/222.1 |
| 5,100,095 | 3/1992 | Haan et al. .............................. 248/549 |
| 5,308,247 | 5/1994 | Dyrdek . |
| 5,327,288 | 7/1994 | Wellington et al. . |
| 5,521,760 | 5/1996 | De Young et al. . |
| 5,572,354 | 11/1996 | Desmond et al. . |
| 5,576,687 | 11/1996 | Blank et al. ............................. 340/438 |
| 5,669,698 | 9/1997 | Veldman et al. ....................... 362/83.1 |

*Primary Examiner*—Cassandra Spyrou
*Assistant Examiner*—Mohammad Y. Sikder
*Attorney, Agent, or Firm*—Price, Heneveld, Cooper, DeWitt & Litton

[57] ABSTRACT

A mounting assembly (10) for a vehicle interior rearview mirror (12) of the automatic dimming type includes a vehicle mount (14) having a rearwardly projecting first ball portion (22), a tube (32) having a first end that receives the first ball portion and a second end including a rearwardly projecting second ball portion (38) fixed with respect to the tube and having a wire hole (40) therethrough, a ball clamp (44) within the tube for engaging the first ball portion (22), a helical spring (46) for biasing the ball clamp to a clamping relationship with the first ball portion, and a mirror socket (48) for receiving and clamping the second ball portion. The tube (32) of the mounting assembly and the first ball portion (38) are unitary in one embodiment, while another embodiment has the tube (32') and second ball portion (38') provided with flanges (52) and (54) that are biased into engagement with each other by the helical spring (46). The ball clamp (44) has circumferentially spaced seat portions (56) that seat the helical spring (46), clamping portions (58) respectively aligned with the seat portions (56), and a wire conduit (60) extending substantially to the hole (40) in the second ball portion (38).

20 Claims, 1 Drawing Sheet

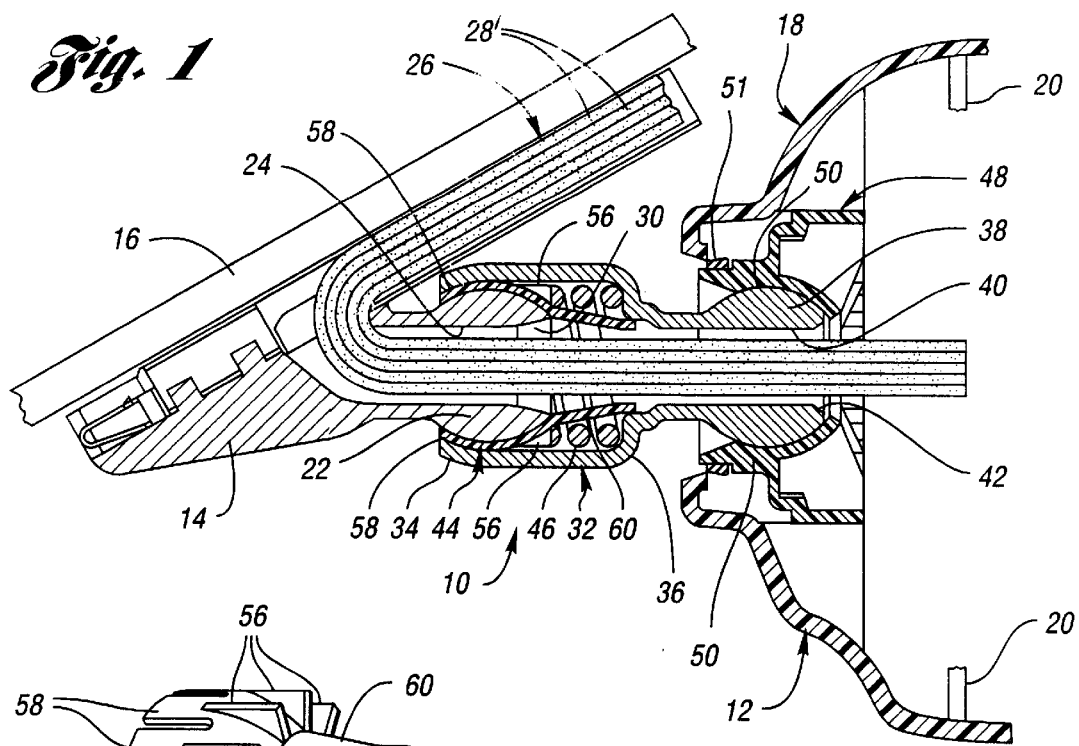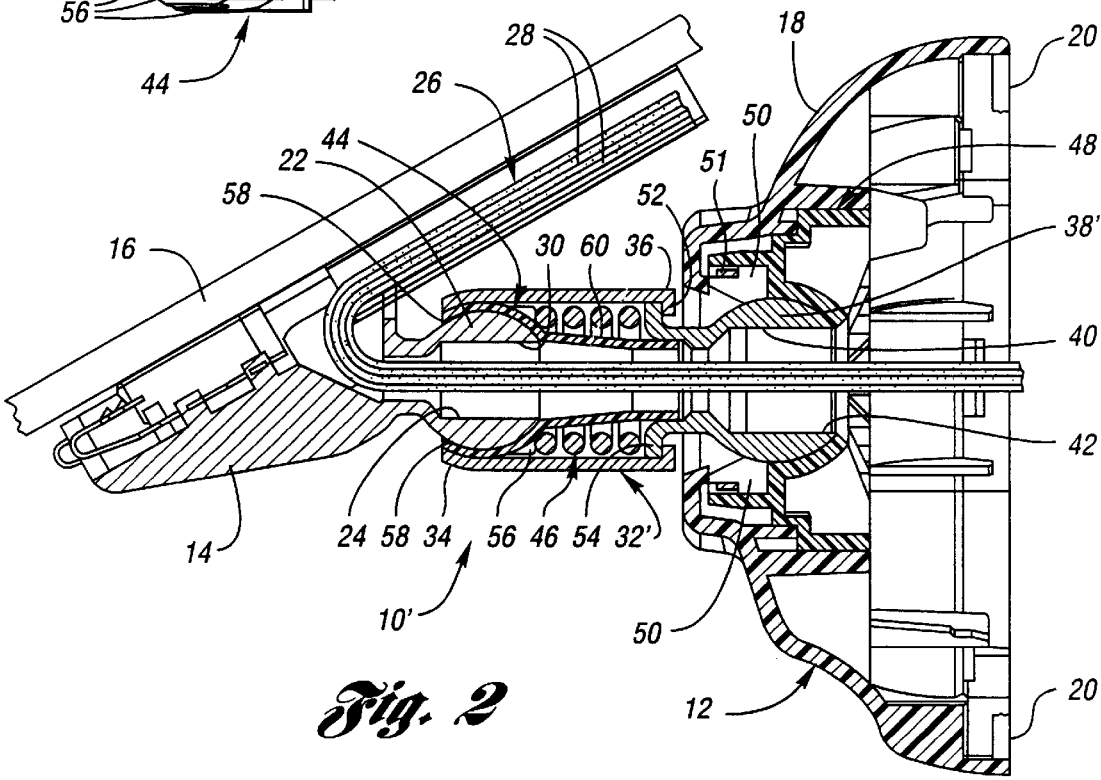

MOUNTING ASSEMBLY FOR VEHICLE INTERIOR AUTOMATIC DIMMING REARVIEW MIRROR

TECHNICAL FIELD

This invention relates to a mounting assembly for mounting a vehicle interior rearview mirror of the automatic dimming type.

BACKGROUND ART

For the last 30 years or so, one common mounting assembly for vehicle interior rearview mirrors has been a tubular dual ball and spring construction such as disclosed by U.S. Pat. No. 3,367,616 Bousch et al. With that construction, a spring biases vehicle-mounted and mirror-mounted balls into engagement with opposite ends of a tube, and the mirror can be adjusted by rotation of each of the two balls. It is usually desirable to adjust the mirror at the mirror-mounted ball; however the same spring biases both balls and as such both will rotate at the same level of force unless there are different clamp members or ball clamp members of the same construction but made of materials having different coefficients of friction. Other dual ball mounts of this type are disclosed by U.S. Pat. Nos. 4,646,210 Skogler et al., 5,327,288 Wellington et al., and 5,521,760 DeYoung et al.

Vehicle interior rearview mirrors of the automatic dimming type are conventionally about twice as heavy as standard rearview mirrors and, as such, it is desirable for the mirror ball to be located closer to the center of gravity of the mirror in order to facilitate its adjustment. See, U.S. Pat. No. 5,572,354 Desmond et al. which has a three ball mount wherein two balls are located within a tube with one adjacent the vehicle and the other adjacent the mirror and with the mirror ball having a third ball that is received by a mirror housing socket to provide mounting thereof. Thus, this mounting assembly has three locations of rotatable adjustment as opposed to the two locations of adjustment with a dual ball type of mounting assembly as described above.

Vehicle interior rearview mirrors have also previously included ball connections having balls with holes through which electrical wires can pass such as disclosed by U.S. Pat. Nos. 2,414,223 DeVirgilis and 5,308,247 Dyrdek.

Other vehicle interior rearview mirrors are disclosed by U.S. Pat. Nos. 4,614,412 Cohen and 4,822,140 Mittelhauser.

DISCLOSURE OF INVENTION

An object of the present invention is to provide an improved mounting assembly for mounting a vehicle interior rearview mirror of the automatic dimming type.

In carrying out the above object, the mounting assembly of this invention includes a vehicle mount having a rearwardly projecting first ball portion having a wire hole extending therethrough to receive a wire bundle for powering the mirror. A tube of the mounting assembly has a first end that receives the first ball portion and has a second end including a rearwardly projecting second ball portion that is fixed with respect to the tube and has a wire hole therethrough for also receiving the wire bundle. A ball clamp of the mounting assembly is received within the tube and engages the first ball portion, and a helical spring within the tube biases the ball clamp to provide a clamping relationship with the first ball portion. A mirror socket of the mounting assembly receives and clamps the second ball portion and provides mounting of an automatic dimming mirror that can be powered by wires extending through the wire holes of the ball portions.

Two different embodiments of the mounting assembly are disclosed with one of the embodiments having the tube and second ball portion unitary with each other, and with the other embodiment having the tube and second ball portion having flanges that are biased into engagement with each other by the helical spring.

In the preferred construction, the ball clamp has a plurality of circumferentially spaced seat portions that cooperatively seat the helical spring, and the ball clamp also has a plurality of circumferentially spaced clamping portions respectively aligned with the seat portions. In addition, the ball clamp has a wire conduit that extends substantially to the hole in the second ball portion with the wire bundle extending therethrough between the ball portions.

The above objects, features, and advantages of the present invention are readily apparent from the following detailed description of the best modes for carrying out the invention when taken in connection with the accompanying drawings.

BRIEF DESCRIPTION OF DRAWINGS

FIG. 1 is a sectional view taken through a mounting assembly constructed in accordance with the present invention to mount a vehicle interior rearview mirror of the automatic dimming type.

FIG. 2 is a sectional view similar to FIG. 1 but illustrating another embodiment.

FIG. 3 is a perspective view illustrating a ball clamp that is utilized with each of the embodiments of the mounting assembly.

BEST MODES FOR CARRYING OUT THE INVENTION

With reference to FIG. 1 of the drawings, a mounting assembly generally indicated by 10 is constructed in accordance with the present invention to provide mounting of a vehicle interior rearview mirror 12 of the automatic dimming type that is electrically powered and may also support accessory apparatus that is electrically powered and/or operated. The mounting assembly 10 includes a vehicle mount 14 of any conventional type that is constructed to be mounted on a vehicle such as on the windshield 16 whose interior surfaces faces downwardly and to the right as illustrated. The automatic dimming mirror 12 supported by the mounting assembly 10 includes a housing 18 that supports an automatic dimming mirror element 20 facing rearwardly toward the right.

As illustrated in FIG. 1, the vehicle mount 14 has a rearwardly projecting first ball portion 22 that has a wire hole 24 therethrough for receiving a wire bundle 26 including a plurality of wires 28 that power the mirror 12 and also power and/or control any accessory components. At the rear right extremity of the first ball portion 22, the wire hole 24 has an outwardly flared end 30 to accommodate for the wire bundle 26 upon rotatable adjustment of the mounting assembly at the first ball portion 22 as is hereinafter more fully described.

Mounting assembly 10, as also shown in FIG. 1 includes a support assembly that supports the mirror 12 on the vehicle mount 14. The support assembly includes a tube 32, a ball clamp 44, and a spring 46. The tube 32 includes a first end 34 that receives the first ball portion 22 and is curved inwardly to provide a clamping relationship as is hereinafter more fully described. The tube 32 also has a second end 36 including a rearwardly projecting second ball portion 38 that is fixed with respect to the tube and has a wire hole 40 therethrough for accommodating the wire bundle 26. At the right rear extremity of the second ball portion 38, the hole 40 has an outwardly flared shape 42 that accommodates for the wire bundle 26 upon adjustment of the mounting assembly about the second ball portion 38 as is hereinafter more fully described.

With reference to FIGS. 1 and 3, the mounting assembly includes a ball clamp 44 received within the tube 32 and engaging the first ball portion 22. A helical spring 46 is seated by the second tube end 36 and is also seated against the ball clamp 44 to provide a clamping relationship with the first ball portion 22. A mirror mount or mirror socket 48 is mounted in any suitable manner by the mirror housing 18 and has socket portions 50 for receiving and clamping the second ball portion 38 with a metal clamp ring 51 extending around the socket portions to provide a resilient clamping relationship.

Adjustment of the mounting assembly 10 can take place at either the first ball portion 22 or the second ball portion 38. At the first ball portion 22, the adjustment takes place about the vehicle mount 14 and the force required to provide the adjustment is controlled by the biasing of the spring 46 and the friction between the clamp member 44 and the first ball portion. Furthermore, adjustment of the mirror 12 takes place about the second ball portion 38 with the force required to overcome the positioning controlled by the clamp ring 51 and the coefficient of friction between the second ball portion 38 and the socket portions 50.

With continuing reference to FIG. 1, it will be noted that the tube 32 and the second ball portion 38 are constructed unitary with each other in this embodiment. Thus, the fixed relationship of the second ball portion 38 with respect to the tube 32 is provided by this unitary construction with the wire bundle 26 extending through the hole 40 in the second ball portion as well as through the hole 24 in the first ball portion 22 to provide the mirror dimming operation and the control of any electric accessory components.

With reference to FIG. 2, another embodiment 10' of the mounting assembly has the same construction as the previously described embodiment except as will be noted such that its components are identified by like reference numerals and much of the previous description is applicable and need not be repeated. However, the embodiment 10' of the mounting assembly has its tube 32' and second ball portion 38' constructed as separate components instead of being unitary as in the previously described embodiment. Furthermore, the tube 32' has an annular flange 52 and the second ball portion 38' has an annular flange 54, and these flanges 52 and 54 are biased into engagement with each other by the rear end of the helical spring 46 so as to provide the fixed relationship between the second ball portion 38' and the tube 32'.

The ball clamp 44 illustrated in FIG. 3 is utilized with both of the embodiments of the mounting assembly 10 and 10' respectively illustrated in FIGS. 1 and 2 and is preferably injection molded from a suitable plastic such as acetal. More specifically, the ball clamp 44 has a plurality of circumferentially spaced seat portions 56 that cooperatively seat the adjacent end of the helical spring 46 in the assembled condition. This construction allows the ball clamp 44 to fully engage the rear extremity of the first ball portion 22 adjacent the seat portions 56 to provide a stronger clamped condition than prior clamp members that do not fully engage the ball portion. Furthermore, the ball clamp has a plurality of circumferentially spaced clamping portions 58 respectively aligned with the seat portions 46 and extending forwardly around the first ball portion 22 adjacent the inwardly curved first end 34 of the tube. Thus, upon assembly, the clamping portions 58 move toward each other as they assume the inward curvature of the ball extending forwardly past its full diameter.

With continuing reference to FIG. 3 and reference also to the embodiments of FIGS. 1 and 2, the ball clamp 44 also has a wire conduit 60 that extends substantially to the hole 40 in the second ball portion 38 with the wire bundle 26 extending therethrough between the ball portions. The wire conduit 60 is positioned inside of a cavity defined by the helical spring 46 and defines a wire-receiving passageway that generally aligns with the wire hole 24.

While the best modes for carrying out the invention have been described in detail, those familiar with the art to which this invention relates will recognize various alternative designs and embodiments for practicing the invention as defined by the following claims.

What is claimed is:

1. A mounting assembly for mounting a vehicle interior rearview mirror of the automatic dimming type, comprising:
   a vehicle mount having a rearwardly projecting first ball portion having a wire hole therethrough;
   a tube having a first end that receives the first ball portion and having a second end including a rearwardly projecting second ball portion that is fixed with respect to the tube and has a wire hole therethrough;
   a ball clamp received within the tube and engaging the first ball portion; a spring within the tube biasing the ball clamp to provide a clamping relationship with the first ball portion, said ball clamp having a plurality of clamping portions and further having a seat portion arranged proximate the seat portion for engaging the ball portion and still further having a wire conduit that extends toward the second end to define a passageway for wires that generally aligns with the wire hole;
   a spring within the tube biasing the ball clamp to provide a clamping relationship with the first ball portion; and
   a mirror socket for receiving and clamping the second ball portion and for mounting an automatic dimming mirror that can be powered by wires extending through the wire holes of the ball portions.

2. A mounting assembly for mounting an automatic dimming rearview mirror as in claim 1 wherein the tube and second ball portion are unitary with each other.

3. A mounting assembly for mounting an automatic dimming rearview mirror as in claim 1 wherein the tube and second ball portion have flanges that are biased into engagement with each other by the spring.

4. A mounting assembly for mounting an automatic dimming rearview mirror as in claim 1 wherein the spring comprises a helical spring, and wherein the ball clamp has a plurality of circumferentially spaced seat portions that cooperatively seat the helical spring.

5. A mounting assembly for mounting an automatic dimming rearview mirror as in claim 4 wherein the ball clamp has a plurality of circumferentially spaced clamping portions respectively aligned with the seat portions.

6. A mounting assembly for mounting an automatic dimming rearview mirror as in claim 1 wherein the ball clamp has a wire conduit that extends substantially to the hole in the second ball portion.

7. A mounting assembly for mounting an automatic dimming rearview mirror as in claim 6 wherein the spring comprises a helical spring, and wherein the ball clamp has a plurality of circumferentially spaced seat portions that cooperatively seat the helical spring, and the ball clamp having a plurality of circumferentially spaced clamping portions respectively aligned with the seat portions.

8. The mounting assembly for mounting a vehicle interior rearview mirror of the automatic dimming type as in claim 6 wherein the spring is a helical spring defining an internal cavity with the wire conduit positioned at least partially in the internal cavity.

9. The mounting assembly for mounting a vehicle interior rearview mirror of the automatic dimming type as in claim 1 wherein the ball clamp has a wire conduit that extends toward the hole in the second ball portion, the wire conduit having a tapered section with a non-uniform diameter along its length.

10. A mounting assembly for mounting a mirror having an electrically operated component, comprising:

a vehicle mount;

a mirror mount for supporting the mirror; and a support assembly including a tube, the vehicle mount and the mirror mount forming adjustable connections with the support assembly generally located at each end of the tube;

a first one of the adjustable connections including a ball portion having a wire hole therethrough, and the support assembly including a ball clamp in the tube having a mating socket constructed to pivotally engage the ball portion;

the support assembly further including a spring received within the tube that biases the ball clamp, causing the ball portion and the mating socket to engage with a clamping relationship at the first one adjustable connection, said ball clamp having a plurality of circumferentially positioned clamping portions engaging the ball portion and further having a wire conduit that extends toward the second end to define a passageway for wires that generally aligns with the wire hole, the ball clamp defining a wire passageway that is in communication with and generally aligned with the wire hole so that wires can be extended therethrough from the vehicle mount to the mirror mount to operate the electrically operated component.

11. The mounting assembly defined in claim 10, wherein a second one of the adjustable connections includes a second ball portion and a second mating socket, the second ball portion being fixed to the tube.

12. The mounting assembly defined in claim 11, wherein the tube and the second ball portion are unitary.

13. The mounting assembly defined in claim 11, wherein the tube and the second ball portion have flanges that are biased into engagement with each other by the spring.

14. The mounting assembly defined in claim 11, wherein the ball clamp has a plurality of circumferentially spaced seat portions that cooperatively seat the helical spring.

15. A mounting assembly for mounting a vehicle rearview mirror having an electrically operated component, comprising:

a vehicle mount;

a mirror mount for supporting the mirror; and a support assembly including a tube, one of the vehicle mount and the mirror mount including a projecting ball portion with a wire hole therethrough, and the tube having a first end that receives the ball portion and a second end;

the support assembly further including a ball clamp received within the tube that engages the ball portion, the ball clamp having a plurality of circumferentially spaced seat portions and further having a plurality of circumferentially spaced clamping portions aligned with the seat portions for engaging the ball portion and still further having a wire conduit that extends toward the second end to define a passageway for wires that generally aligns with the wire hole;

the support assembly still further including a spring received within the tube and seated by the spaced seat portions of the ball clamp to bias the ball clamp into clamping relationship with the ball portion, the passageway of the wire conduit and the wire hole being configured so that wires can be extended therethrough from the vehicle mount to the mirror mount to operate the electrically operated component.

16. The mounting assembly defined in claim 15, wherein the projecting ball portion extends from the vehicle mount.

17. The mounting assembly defined in claim 16, wherein the second end of the tube includes a rearwardly projecting second ball portion that is fixed with respect to the tube and has a wire hole therethrough.

18. The mounting assembly defined in claim 17, wherein the second ball portion and the tube are unitary with each other.

19. The mounting assembly defined in claim 17, wherein the spring comprises a helical spring, and wherein the second ball portion and the tube have flanges that are biased into engagement with each other by the helical spring.

20. A mounting assembly for mounting a vehicle interior rearview mirror of the automatic dimming type, comprising:

a vehicle mount having a rearwardly projecting first ball portion having a wire hole therethrough;

a tube having a first end that receives the first ball portion and having a second end including a rearwardly projecting second ball portion that is fixed with respect to the tube and has a wire hole therethrough;

a ball clamp received within the tube and engaging the first ball portion, said ball clamp having a plurality of circumferentially positioned clamping portions engaging the ball portion and further having a wire conduit that extends toward the second end to define a passageway for wires that generally aligns with the wire hole;

a spring within the tube biasing the ball clamp to provide a clamping relationship with the first ball portion; and a mirror socket for receiving and clamping the second ball portion and for mounting an automatic dimming mirror that can be powered by wires extending through the wire holes of the ball portions.

* * * * *